United States Patent
Swayne

(10) Patent No.: US 7,210,577 B2
(45) Date of Patent: May 1, 2007

(54) COVER AND MEDIA DISK DISPLAY APPARATUS FOR A CONTAINER

(75) Inventor: Gregory M. Swayne, Alpharetta, GA (US)

(73) Assignee: East End, Inc., Ojai, CA (US)

( * ) Notice: Subject to any disclaimer, the term of this patent is extended or adjusted under 35 U.S.C. 154(b) by 80 days.

(21) Appl. No.: 10/768,499

(22) Filed: Jan. 30, 2004

(65) Prior Publication Data
US 2005/0167294 A1 Aug. 4, 2005

(51) Int. Cl.
B65D 85/57 (2006.01)
(52) U.S. Cl. ............ 206/308.1; 206/217; 206/232
(58) Field of Classification Search ............ 206/217, 206/232, 303, 308.1, 309, 311, 312; 40/307, 40/310, 311; 220/4.22, 4.23
See application file for complete search history.

(56) References Cited

U.S. PATENT DOCUMENTS

| | | | |
|---|---|---|---|
| 1,395,594 A | 11/1921 | Pfefferle | |
| 1,755,042 A | 4/1930 | Zoller | |
| 1,773,972 A | 8/1930 | Eberhart | |
| 2,015,028 A | 9/1935 | Gillette | |
| 2,050,487 A | 8/1936 | Durrant | |
| 2,120,403 A | 6/1938 | Godfrey | |
| 2,129,406 A | * 9/1938 | Cole | 215/354 |
| 2,174,618 A | 10/1939 | Burdick | |
| 2,271,589 A | 2/1942 | Hendrickson | |
| 2,374,092 A | 4/1945 | Glaser | |
| 2,649,984 A | 8/1953 | Abt | |
| 2,766,796 A | 10/1956 | Tupper | |
| 3,071,281 A | 1/1963 | Sawai | |
| 3,245,691 A | 4/1966 | Gorman | |
| 3,269,734 A | 8/1966 | Ottofy | |
| 3,421,653 A | 1/1969 | Whaley | |
| 3,433,378 A | 3/1969 | Ross | |
| 3,561,668 A | 2/1971 | Bergstrom | |
| 3,624,787 A | 11/1971 | Newman | |
| D226,063 S | 1/1973 | Warnberg | |
| 3,734,276 A | 5/1973 | Bank | |
| 3,745,055 A | 7/1973 | Gorman | |
| 3,746,158 A | 7/1973 | Connick | |
| 3,768,688 A | 10/1973 | Linke | |
| D243,231 S | 2/1977 | Smith | |
| 4,007,936 A | 2/1977 | Hornsby, Jr. | |
| 4,018,355 A | 4/1977 | Ando | |
| 4,074,827 A | 2/1978 | Labe, III | |
| 4,389,802 A | 6/1983 | McLaren et al. | |
| 4,586,625 A | 5/1986 | Garrett | |
| 4,691,501 A | * 9/1987 | King | 53/485 |
| 4,765,501 A | * 8/1988 | Kao | 220/4.21 |
| 4,925,051 A | 5/1990 | Herbst | |

(Continued)

Primary Examiner—David T. Fidei
(74) Attorney, Agent, or Firm—Henricks, Slavin & Holmes LLP

(57) ABSTRACT

A lid assembly for a container with a top portion that defines a container opening area includes a bottom lid member sized to fit over the top portion of the container. The bottom lid member includes an extension portion configured to mechanically engage the bottom lid member with the top portion of the container and to provide a peripheral structure with a peripheral structure area larger than the container opening area. The lid assembly also includes a top lid member configured to mechanically engage with the bottom lid member such that a premium storage space is provided therebetween.

17 Claims, 2 Drawing Sheets

U.S. PATENT DOCUMENTS

| | | | |
|---|---|---|---|
| 4,971,211 A | 11/1990 | Lake | |
| 4,971,220 A * | 11/1990 | Kaufman et al. | 220/832 |
| 5,064,082 A | 11/1991 | Lombardi et al. | |
| 5,085,318 A * | 2/1992 | Leverick | 206/308.1 |
| 5,099,232 A | 3/1992 | Howes | |
| 5,180,079 A | 1/1993 | Jeng | |
| 5,325,982 A | 7/1994 | Cobb, Jr. | |
| 5,375,828 A | 12/1994 | Shikami | |
| 5,393,258 A | 2/1995 | Karterman | |
| 5,397,023 A | 3/1995 | Toczek et al. | |
| 5,489,026 A | 2/1996 | D'Aloia | |
| 5,524,788 A | 6/1996 | Plester | |
| 5,531,347 A | 7/1996 | Goulding | |
| 5,542,532 A | 8/1996 | Mitchell | |
| 5,592,766 A | 1/1997 | Mygatt | |
| 5,641,063 A | 6/1997 | Gambardella et al. | |
| D384,580 S | 10/1997 | Fernandes et al. | |
| 5,695,084 A | 12/1997 | Chmela et al. | |
| 5,713,463 A | 2/1998 | Lakoski et al. | |
| 5,722,558 A | 3/1998 | Thompson | |
| 5,743,423 A * | 4/1998 | Franco | 220/23.86 |
| 5,746,312 A | 5/1998 | Johnson | |
| 5,769,263 A | 6/1998 | Willingham et al. | |
| 5,785,172 A | 7/1998 | Bolognia et al. | |
| 5,792,496 A * | 8/1998 | Fekete et al. | 426/104 |
| 5,806,707 A | 9/1998 | Boehm et al. | |
| 5,829,583 A | 11/1998 | VerWeyst et al. | |
| 5,971,195 A | 10/1999 | Reidinger et al. | |
| 5,996,832 A | 12/1999 | Nieuwoudt | |
| 6,070,752 A | 6/2000 | Nava et al. | |
| 6,085,919 A * | 7/2000 | Singer | 215/10 |
| 6,112,891 A | 9/2000 | Wohl et al. | |
| 6,158,155 A | 12/2000 | Boney | |
| 6,196,411 B1 | 3/2001 | Nava et al. | |
| 6,299,014 B1 | 10/2001 | Nava et al. | |
| 6,302,288 B1 | 10/2001 | Nava et al. | |
| 6,349,821 B1 | 2/2002 | Gordon et al. | |
| 6,364,102 B1 | 4/2002 | Gordon et al. | |
| 6,454,087 B2 | 9/2002 | Gordon et al. | |
| 6,463,026 B1 * | 10/2002 | Anderson | 720/719 |
| 6,647,696 B2 | 11/2003 | Gordon et al. | |
| 6,675,960 B2 | 1/2004 | Innis | |
| 2001/0045368 A1 | 11/2001 | Gordon et al. | |
| 2002/0005365 A1 | 1/2002 | Gordon et al. | |
| 2002/0020638 A1 | 2/2002 | Gordon et al. | |
| 2002/0020639 A1 | 2/2002 | Gordon et al. | |
| 2002/0043473 A1* | 4/2002 | Lee et al. | 206/217 |
| 2003/0062272 A1* | 4/2003 | Gordon et al. | 206/232 |
| 2004/0031797 A1 | 2/2004 | Farnsworth et al. | |
| 2004/0050724 A1* | 3/2004 | Grul et al. | 206/217 |
| 2005/0092629 A1* | 5/2005 | Choi | 206/308.1 |

* cited by examiner

COVER AND MEDIA DISK DISPLAY APPARATUS FOR A CONTAINER

BACKGROUND OF THE INVENTION

A variety of lid assemblies to which premiums (e.g., digital media disks, CD-ROM business cards, phone cards, coupons, booklets, advertising materials, etc.) can be attached are known. It would be helpful if a lid assembly or apparatus could function as a secure cover for a container opening while also holding, protecting and displaying a media disk (or other premium) which is larger in size than the container opening.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense, but is made merely for the purpose of illustrating the general principles of the invention.

Figure 1:
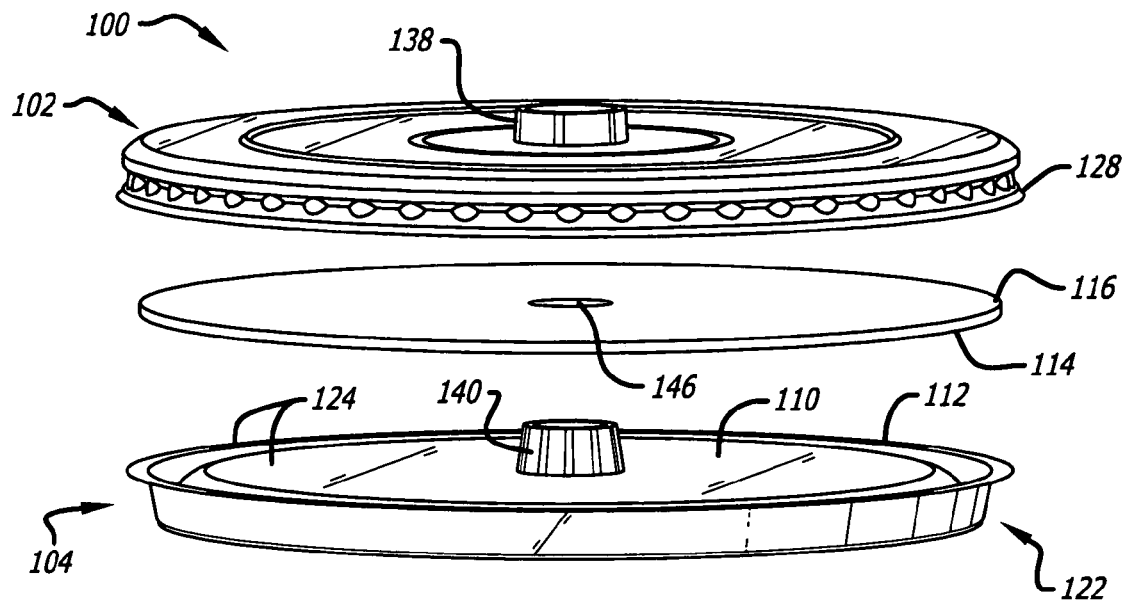
FIG. 1 is an exploded perspective view of an example lid assembly and media disk according to an embodiment of the present invention.
Figure 2:
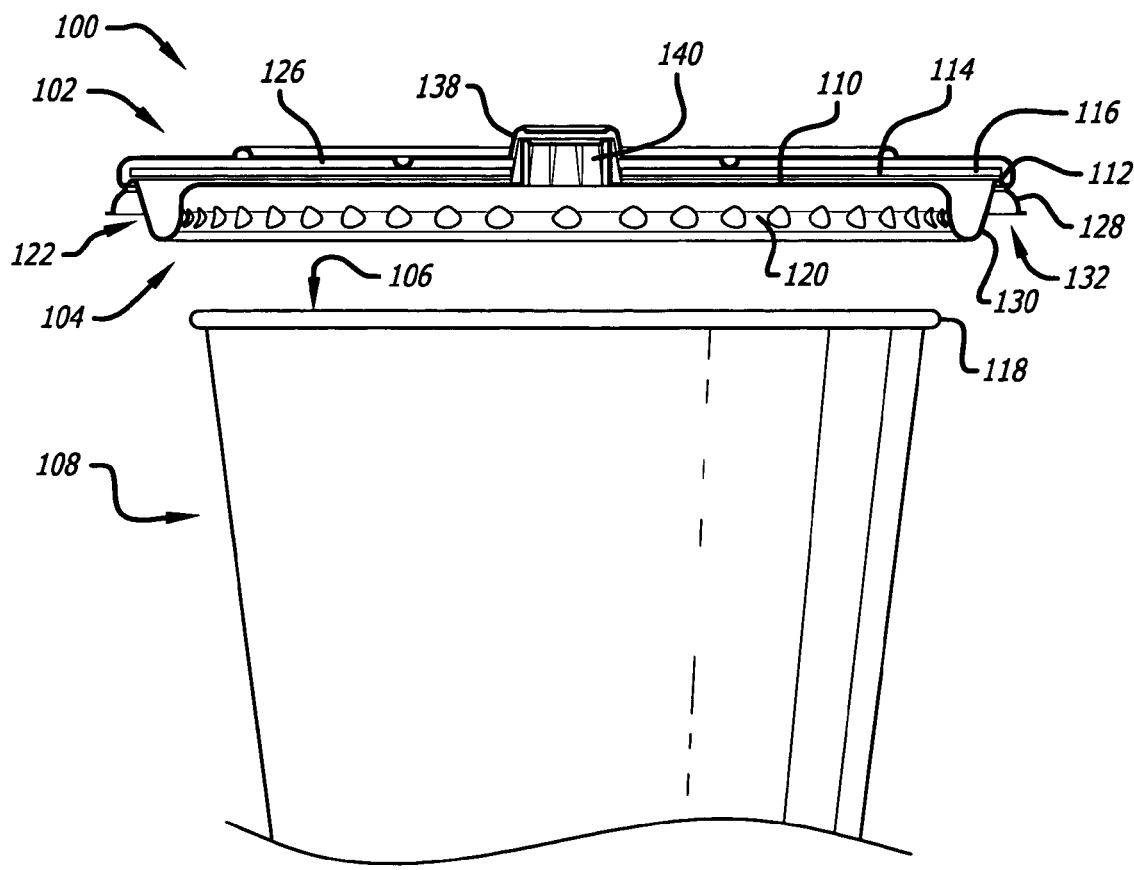
FIG. 2 is a cross-sectional view of the lid assembly and media disk of FIG. 1 fitted together and shown adjacent a top portion of a container.
Figure 3:
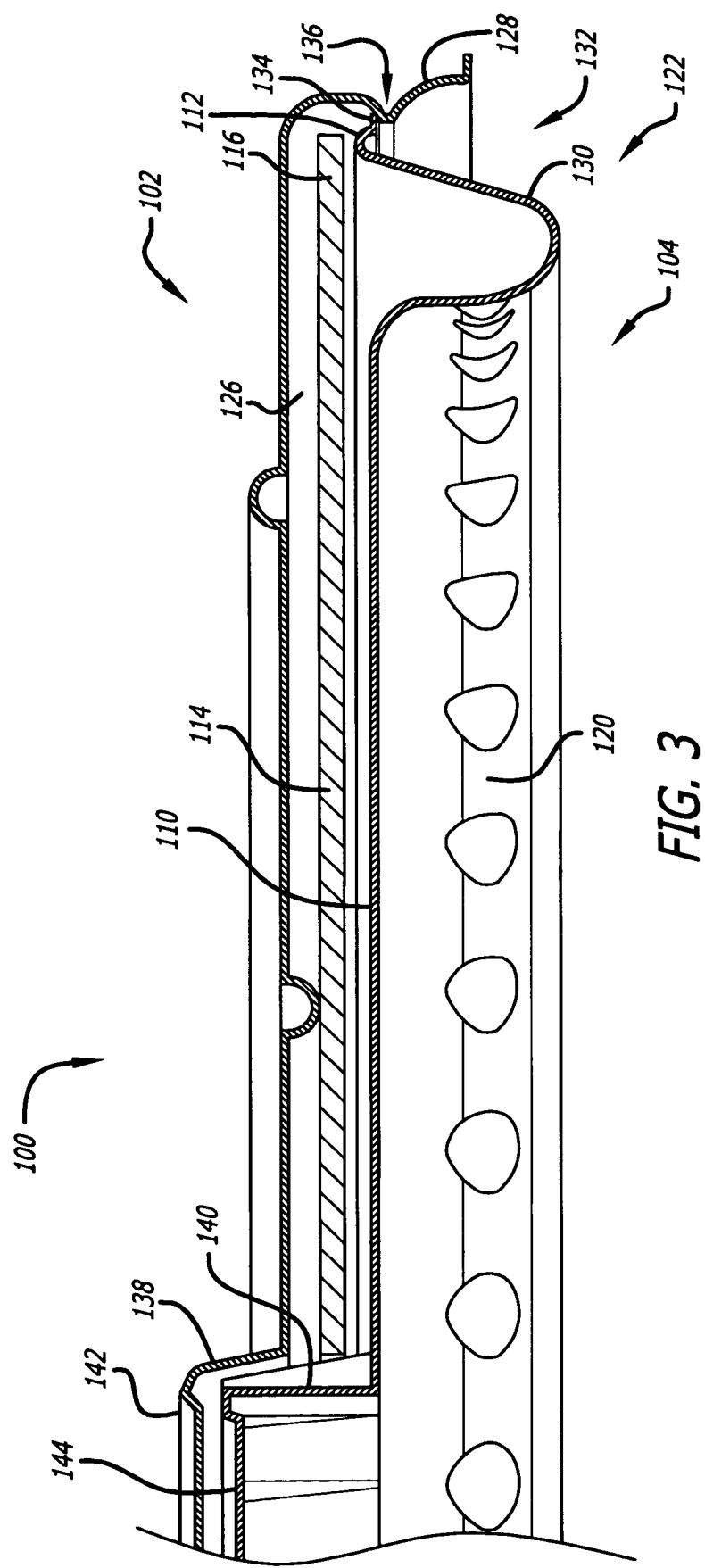
FIG. 3 is an exploded cross-sectional, partial view of the lid assembly and media disk as fitted together in FIG. 2.

Referring to FIGS. 1–3, an example lid assembly 100 according to the present invention includes a top lid member 102 and a bottom lid member 104 formed as shown. The bottom lid member 104 is configured to fit over an opening 106 of a container 108 and to provide an inner support surface 110 and an outer support surface 112 for a media disk 114. The inner support surface 110 is sized to cover the opening 106 of the container 108. The outer support surface 112 is positioned around the opening 106 of the container 108 and configured to support a peripheral portion 116 of the media disk 114. Thus, according to an embodiment of the present invention, a cover and media disk display apparatus for a container with an opening includes a lid member configured to fit over the opening of the container and to provide a plurality of support surfaces for a media disk, at least one of the support surfaces being positioned around the opening of the container.

With respect to the container 108, the opening 106 is defined by a top portion 118. In the illustrated example, the top portion 118 is the lip of a conventional cup and the opening 106 is circular in shape. It should be appreciated however that the principles of the present invention are applicable to a great variety of different container types. By way of example, the container 108 can be a beverage cup (for cold or hot drinks) or a soup cup (e.g., for noodle soup). Furthermore, it should be appreciated that lid apparatuses and assemblies according to the present invention can also be configured to fit over container openings that have non-circular shapes (e.g., square, oval), as well as over container openings that have non-planar and/or noncontiguous top portions.

The bottom lid member 104 is sized to fit over the top portion 118 of the container 108. To this end, the bottom lid member 104 is formed in a fashion complementary to the top portion 118. In the example embodiment, the bottom lid member 104 is configured with a recessed portion 120 as shown for engaging with the top portion 118.

In the example embodiment, the bottom lid member 104 includes an extension portion 122 configured to mechanically engage the bottom lid member 104 with the top portion 118 of the container 108. In the example embodiment, the extension portion 122 curves downward from the inner support surface 110 and back upward ending at the outer support surface 112 as shown. In the example embodiment, the recessed portion 120 is formed in the extension portion 122 as shown. Thus, the outer support surface 112 provides a peripheral structure with a peripheral structure area larger than the container opening area. As discussed above, the peripheral structure is configured to support the media disk 106.

More generally, the plurality of support structures can be configured to support a variety of different premiums (e.g., digital media disks, CD-ROM business cards, phone cards, coupons, booklets, advertising materials, etc.) In the example embodiment, the inner support surface 110 and the outer support surface 112 are configured to support a media disk that has an outer diameter of approximately 120 mm. It should be appreciated however that the principles of the present invention are also applicable to lid apparatuses and assemblies that are configured to accommodate media disks of other sizes or shapes, as well as different types of premiums.

Lid apparatuses and assemblies according to the present invention can also include a mechanism for securing the media disk to the lid member. By way of example, the mechanism for securing can include an adhesive material 124 applied to at least one of the support surfaces. The mechanism for securing can also include a cover member configured to fit over the media disk and to mechanically engage with the lid member. In the example embodiment, the cover member is provided in the form of the top lid member 102 which is configured to mechanically engage with the bottom lid member 104 such that a premium storage space 126 is provided therebetween. In the example embodiment, the premium storage space 126 is shaped to hold a media disk with an outer diameter of approximately 120 mm, and at least a portion of the top lid member 102 over the premium storage space 126 is transparent for viewing articles secured within the premium storage space 126. As with the plurality of support surfaces, it should be appreciated that the premium storage space 126 can be configured to accommodate media disks of other sizes or shapes, as well as different types of premiums.

The top lid member 102 is configured to mechanically engage with the peripheral structure. In the example embodiment, the top lid member 102 has an outer edge portion 128 that fits over and extends downward from the peripheral structure (outer support surface 112). In the example embodiment, the extension portion 122 includes a side portion 130 facing the outer edge portion 128, and the side portion 130 and the outer edge portion 128 are shaped to provide a gap 132 therebetween for separating the top lid member 102 from the bottom lid member 104. In the example embodiment, the side portion 130 and the outer edge portion 128 are shaped to provide a gap 132 that is ergonomically configured to facilitate easy insertion of a human finger therein and to prevent unwanted separation of the bottom lid member 104 from the container 108 when the top lid member 102 is being separated from the bottom lid member 104.

In the example embodiment, the extension portion 122 includes a cantilevered edge 134 extending from slightly below the outer support surface 112 as shown. In the example embodiment, the top lid member 102 includes a ridge portion 136 formed as shown in a fashion complementary to the cantilevered edge 134 such that the ridge portion 136 snap fits over the cantilevered edge 134. It should be appreciated however that top lid member 102 can be configured in other ways to fit around the bottom lid member 104. Thus, a lid assembly for a container according to an example embodiment of the present invention includes a top lid member sized to fit over a media disk and a bottom lid member configured to support the media disk, interfit with the top lid member, and mechanically engage with an opening of a container that is smaller in diameter than the media disk.

In the example embodiment, the top lid member 102 and the bottom lid member 104 include centrally positioned interfitting portions 138 and 140, respectively. The example interfitting portions 138 and 140 are formed with complementary surfaces and with openings 142 and 144, respectively, to receive a drinking straw, stirrer, spoon or the like. In the example embodiment, the interfitting portions 138 and 140 are configured as centrally positioned interfitting protrusions sized to fit within a center hole 146 of the media disk 114.

Although the present invention has been described in terms of the example embodiments above, numerous modifications and/or additions to the above-described embodiments would be readily apparent to one skilled in the art. It is intended that the scope of the present invention extends to all such modifications and/or additions.

I claim:

1. A lid assembly for a container with a top portion that defines a container opening area, the lid assembly comprising:
    a bottom lid member sized to fit over the top portion of the container, the bottom lid member including an extension portion configured to mechanically engage the bottom lid member with the top portion of the container and to provide a peripheral structure; and
    a top lid member configured to mechanically engage with the bottom lid member such that a premium storage space is provided therebetween;
    wherein the bottom lid member and the top lid member, when engaged with each another, form an opening traversing the bottom lid member and the top lid member, the opening facilitates access to container contents while the bottom lid member and the top lid member are engaged with each other and while the bottom lid member is engaged with the top portion of the container;
    wherein the peripheral structure includes an outer support surface with a diameter larger than the container opening area, the outer support surface defining a portion of the premium storage space.

2. The lid assembly of claim 1, wherein the top lid member is configured to mechanically engage with the peripheral structure.

3. The lid assembly of claim 1, wherein the top lid member has an outer edge portion that fits over and extends downward from the peripheral structure.

4. The lid assembly of claim 3, wherein the extension portion includes a side portion facing the outer edge portion, the side portion and the outer edge portion being shaped to provide a gap therebetween for separating the top lid member from the bottom lid member.

5. The lid assembly of claim 1, wherein at least a portion of the top lid member over the premium storage space is transparent.

6. The lid assembly of claim 1, wherein the premium storage space is shaped to hold a media disk.

7. The lid assembly of claim 6, wherein the peripheral structure is configured to support the media disk.

8. The lid assembly of claim 1, wherein the premium storage space is shaped to hold a media disk with an outer diameter of approximately 120 mm.

9. The lid assembly of claim 1, wherein the bottom lid member and the top lid member include centrally positioned openings.

10. The lid assembly of claim 1, wherein the bottom lid member and the top lid member include centrally positioned complementary interfitting portions.

11. The lid assembly of claim 10, wherein centrally positioned complementary interfitting portions include openings therethrough.

12. A lid assembly for a container with a top portion that defines a container opening area, the lid assembly comprising:
    a top lid member sized to fit over a media disk; and
    a bottom lid member configured to support the media disk, interfit with the top lid member, and mechanically engage with the top portion of the container such that a premium storage space is provided between the top lid member and the bottom lid member, the premium storage space having a diameter greater than the top portion of the container;
    wherein the bottom lid member and the top lid member, when interfit with each another, form an opening traversing the bottom lid member and the top lid member, the opening facilitates access to container contents while the bottom lid member and the top lid member are interfit with each other and while the bottom lid member is engaged with the opening of the container.

13. The lid assembly of claim 12, wherein the top lid member is sized to fit over a media disk that has an outer diameter of approximately 120 mm.

14. The lid assembly of claim 12, wherein the top lid member is configured to fit around the bottom lid member.

15. The lid assembly of claim 12, wherein the top lid member and the bottom lid member include centrally positioned interfitting protrusions sized to fit within a center hole of the media disk.

16. The lid assembly of claim 15, wherein the centrally positioned interfitting protrusions include openings formed therethrough.

17. The lid assembly of claim 12, wherein the top lid member and the bottom lid member include centrally positioned openings formed therethrough.

* * * * *